Jan. 4, 1966 B. CATANIA 3,227,958

AMPLITUDE DETECTING DEVICE

Filed Nov. 23, 1962 2 Sheets-Sheet 1

INVENTOR.
BASILIO CATANIA

BY [signature]
ATTY.

Jan. 4, 1966 B. CATANIA 3,227,958

AMPLITUDE DETECTING DEVICE

Filed Nov. 23, 1962 2 Sheets-Sheet 2

United States Patent Office 3,227,958
Patented Jan. 4, 1966

3,227,958

AMPLITUDE DETECTING DEVICE

Basilio Catania, Milan, Italy, assignor to Marelli Lenkurt S.p.A., Milan, Italy

Filed Nov. 23, 1962, Ser. No. 239,617
Claims priority, application Italy, Dec. 23, 1961, 23,141/61
4 Claims. (Cl. 329—168)

The present invention constitutes an improvement over the prior application Serial No. 231,188 filed October 17, 1962, now Patent No. 3,195,060 issued July 13, 1965.

In the principal patent there is illustrated and described a circuit which permits improving the performance of a detector, and in particular, the linearity, the efficiency of the detection, and the response to high speed transients, as well as reducing the absorption of the power of the signal to be detected.

Such improvement is obtained by coupling the detector circuit to an amplifier and carrying back the output signal of the said amplifier to its input with opposite polarity with respect to that of the input signal of the same amplifier.

In the examples of reduction to practice of the above mentioned principal application, the amplifier is connected to the rest of the circuit by means of one of its input terminals and one of its output terminals, the other two terminals being connected together and kept isolated from the rest of the circuit.

The object of the present improvement is to describe a particular circuit arrangement, applicable to a maximum value (or peak) detector, which presents the characteristics and advantages of the invention described in the principal application, and in addition permits the utilization of the generator with one side grounded, to which are also connected one of the input terminals and one of the output terminals of the amplifier.

The said object is attained by decoupling the generator and the amplifier from each other by means of an appropriate system of impedances whereby the amplifier acts like a bipole with a high impedance for the detected signal, and practically like a short-circuit for the carrier wave.

The connection to ground of the above mentioned generator and amplifier proves particularly advantageous, when the frequency of the carrier wave is rather high.

The description of the particular circuit arrangement is made with reference to the appended drawings, in which:

The FIGURE 1 is a schematic representation of the principle of a detecting device of the maximum value type utilizing a non-linear element constituted of a bipole and a voltage amplifier according to the invention;

Figure 3:
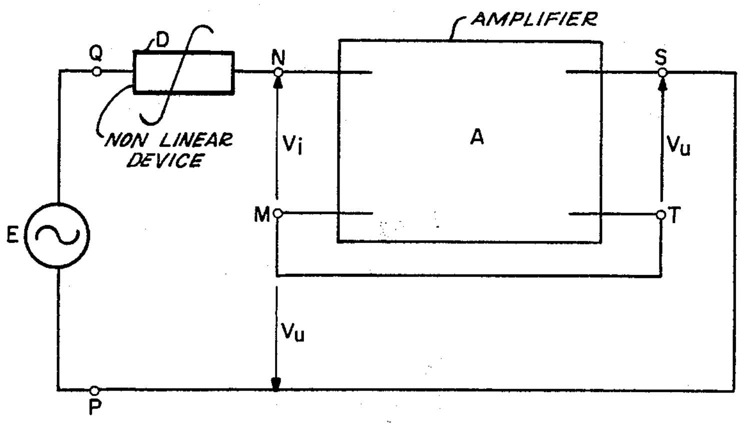
FIG. 3 PRIOR ART
FIG. 3 is an exact copy of FIGURE 1 of the said prior application Serial No. 231,188, now Patent No. 3,195,060 issued July 13, 1965, upon which the present application is an improvement.

As explained in said prior application FIG. 3 shows a generator E with a non-linear element D and an amplifier A connected across the generator. The terminals N and S are connected serially with element D, and terminals M and T of the amplifier are isolated from the rest of the circuit.

Figure 4:
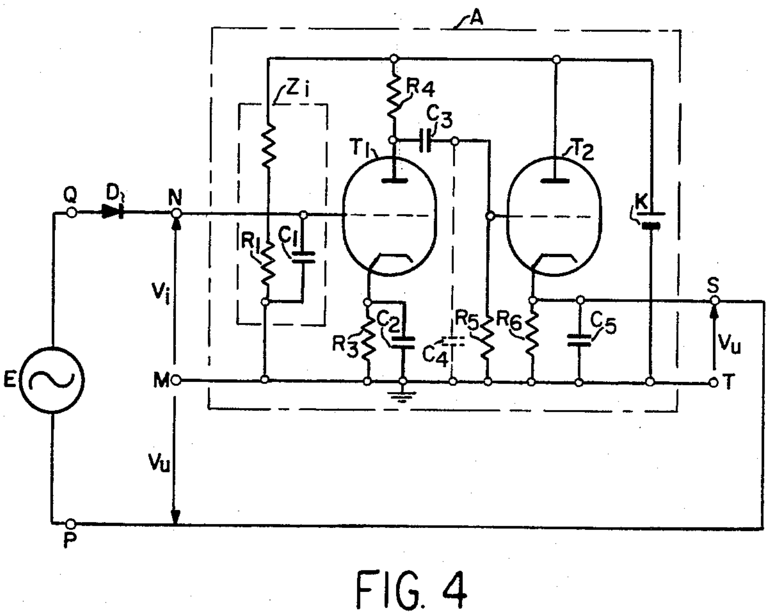
FIG. 4 PRIOR ART
FIG. 4 is an exact copy of FIGURE 4 of said prior application.

FIG. 4 shows a practical construction of the schematic of FIG. 3 as a crest detecting device for video signals. It also shows a generator E, a non-linear device D, and the amplifier A with its terminals N and S connected serially across the generator.

Figure 1:
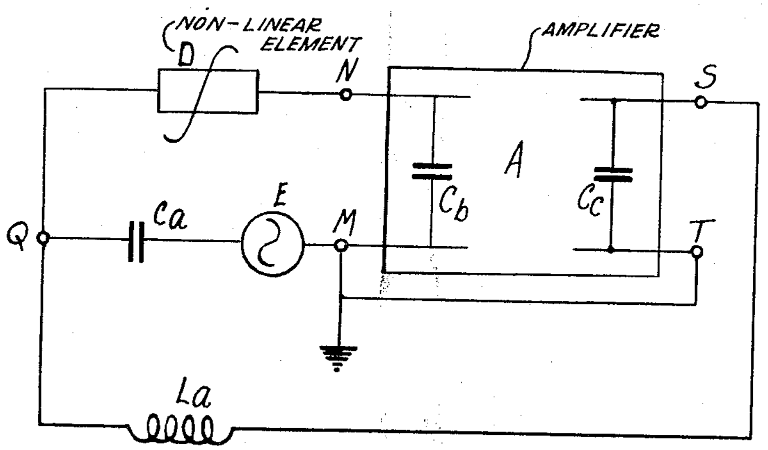

In the FIGURE 1 the amplifier is identified by its input terminals N and M in parallel with which is inserted the condenser $C_b$, and by the output terminals S and T across which is bridged the condenser $C_c$. Either $C_b$ or $C_c$ may be replaced by some other device having a sufficiently low impedance for the carrier wave, and high for the detected signal.

To the input terminal N of the said amplifier is connected the non-linear element D, the other end of which, indicated by Q, is connected to the output terminal S of the amplifier through the inductor $L_a$, and at the same time to the generator E through the condenser $C_a$.

The inductor $L_a$ may be replaced by a device having a high impedance for the carrier wave and low for the detected signal, while the condenser $C_a$ may be replaced by another device having a low impedance for the carrier wave and high for the detected signal.

The other side of the generator E not connected to $C_a$ is connected to ground, to which are also connected the input terminal M and the output terminal T of the amplifier A.

As already stated, the schematic represents a maximum value detecting device, and consequently, in order for the amplifier to be able to present a low impedance for the carrier wave at each pair of terminals M–N and S–T, the condensers $C_b$ and $C_c$ are provided, in parallel respectively with the said terminals; in addition, the amplifier A must be dimensioned to reach a high gain over the entire band occupied by the detector signal, in accordance with the application for the principal patent.

The decoupling between the generator E and the amplifier A is obtained by means of the condenser $C_a$ placed in series with the generator E, and of the inductor $L_a$ placed in series with the output terminal S of the amplifier; such a system, as is known, is very often used whenever it is desired to effect a decoupling between signals, one of which contains low frequency components and the other high frequency components.

Since the condenser $C_a$ prevents the passage of the low frequency current (that is, the components of the detected signal), the amplifier A, with respect to the detected signal, acts like a bipole, the incoming current at M (low frequency) through the generator E being practically zero, while, as already stated, it is equivalent to a short-circuit for the carrier wave.

The impedance presented by the amplifier A between the terminals N and S obviously does not change when the generator E, on the side not connected to $C_a$, is connected to the terminal S rather than to the terminal M, on the supposition already stated, that the condensers $C_b$ and $C_c$ are of a sufficiently high value to localize negligible carrier frequency voltages at their ends, and that the condenser $C_a$ is of a sufficiently low value to prevent the passage of low frequency currents, that is, of the detected signal.

Figure 2:
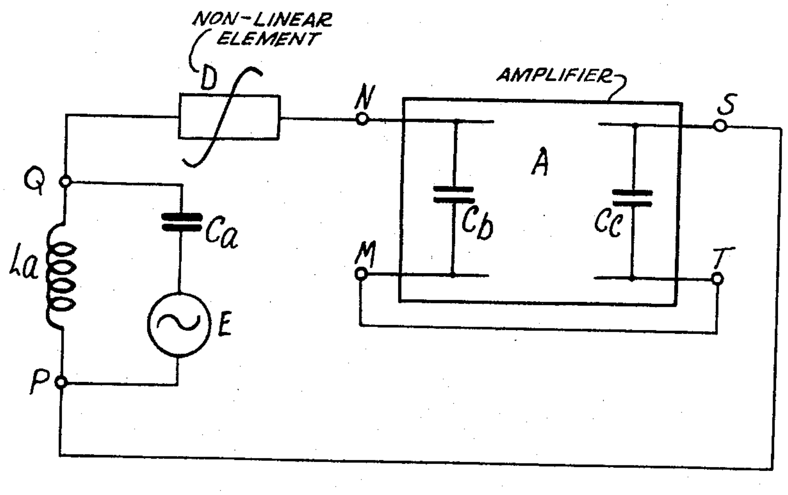
FIGURE 2 represents the equivalent circuit to that of the FIGURE 1.

The FIGURE 2 represents precisely the new arrangement to which the FIGURE 1 is reduced after the above mentioned change has been made, and it is the full equivalent of the FIGURE 1 of the principal patent application No. 231,188 of October 17, 1962, now Patent No. 3,195,-060 issued July 13, 1965.

The circuits of the FIGURE 1 and the FIGURE 2 are also equivalent with respect to the voltage present between the terminals S and Q.

In fact, in both of these schemes, such voltage is equal to the voltage of the generator E, the inductor $L_a$ being of such a value as to be practically equivalent to a short-circuit for the detected signal, and to an open circuit for the carrier wave.

In the case where a double bipole is utilized as the non-linear element, it is still possible to connect one of the input terminals and one of the output terminals of the amplifier to ground, together with other points belonging to the generator or to the non-linear element, provided that no low frequency current passes through such connections, and on the supposition that the input and output impedances of the amplifier are zero for the carrier.

What is claimed is:

1. An amplitude detecting device having an input generator supplying an input signal to be detected, a non-linear element acting as a detector, an amplifier, said generator coupled to the detector and through the detector to the amplifier, one terminal of the generator, one input terminal of the amplifier and one output terminal of the amplifier all connected to ground, an impedance, the other output terminal of the amplifier connected through said impedance to the other terminal of said generator and to the input terminal of the detector, said amplifier acting as a bipole with a high impedance for the detected signal and as a short circuit for the signal from the input generator.

2. An amplitude detecting device such as claimed in claim 1, in which there is a condenser connected between the said other terminal of the generator and the said impedance.

3. An amplitude detecting device such as claimed in claim 1 in which there is one condenser bridged across the input of the amplifier and another condenser bridged across the output thereof.

4. An amplitude detector such as claimed in claim 1 in which there is one condenser connected between the generator and the non-linear element, another condenser connected across the input of the amplifier and a third condenser connected across the output of the amplifier.

References Cited by the Examiner

UNITED STATES PATENTS

| | | | |
|---|---|---|---|
| 2,852,624 | 9/1958 | Young | 330—110 X |
| 3,070,750 | 12/1962 | Farber | 329—169 |

ROY LAKE, *Primary Examiner.*

A. L. BRODY, *Assistant Examiner.*